United States Patent
Ingle et al.

(10) Patent No.: US 8,375,142 B2
(45) Date of Patent: Feb. 12, 2013

(54) MODEL-BASED DATA CENTER MANAGEMENT

(75) Inventors: Anil A. Ingle, Woodinville, WA (US); Benjamin Newman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/349,892

(22) Filed: Jan. 13, 2012

(65) Prior Publication Data
US 2012/0117231 A1    May 10, 2012

Related U.S. Application Data

(63) Continuation of application No. 11/965,915, filed on Dec. 28, 2007, now Pat. No. 8,122,149.

(51) Int. Cl.
*G06F 15/173* (2006.01)

(52) U.S. Cl. ........ 709/239; 709/223; 709/227; 709/230; 709/238

(58) Field of Classification Search .................. 709/223, 709/227, 230, 238, 239
See application file for complete search history.

(56) References Cited

U.S. PATENT DOCUMENTS

| | | | |
|---|---|---|---|
| 5,504,921 | A | 4/1996 | Dev et al. |
| 5,680,634 | A | 10/1997 | Estes |
| 6,556,659 | B1 | 4/2003 | Bowman-Amuah |
| 6,584,499 | B1 | 6/2003 | Jantz et al. |
| 6,714,992 | B1 | 3/2004 | Kanojia et al. |
| 6,769,022 | B1 | 7/2004 | DeKoning et al. |
| 7,146,233 | B2 | 12/2006 | Aziz et al. |
| 7,350,138 | B1 | 3/2008 | Swaminathan et al. |
| 7,478,152 | B2 | 1/2009 | Holt et al. |
| 7,761,622 | B2 | 7/2010 | Nguyen |
| 7,860,961 | B1 | 12/2010 | Finkelstein et al. |
| 2002/0007468 | A1 | 1/2002 | Kampe et al. |
| 2002/0112039 | A1 | 8/2002 | Ullman |
| 2003/0041238 | A1 | 2/2003 | French et al. |
| 2003/0126202 | A1 | 7/2003 | Watt |
| 2003/0126265 | A1 | 7/2003 | Aziz et al. |
| 2005/0108369 | A1 | 5/2005 | Sather et al. |
| 2006/0031447 | A1 | 2/2006 | Holt |
| 2006/0271341 | A1* | 11/2006 | Brown et al. .......... 703/1 |
| 2006/0271677 | A1 | 11/2006 | Mercier |
| 2007/0130286 | A1 | 6/2007 | Hopmann et al. |
| 2009/0144540 | A1* | 6/2009 | Davis et al. .......... 713/156 |

OTHER PUBLICATIONS

M Brodie, I. Rish, and S. Ma, "Intelligent Probing: A Cost-effective Approach to Fault Diagnosis in Computer Networks," Nov. 2, 2007, pp. 1-13, http://researchweb.watson.ibm.com/journal/sj/413/brodie.txt.

M. El-Darieby and A. Bieszczad, "Intelligent Mobile Agents: Towards Network Fault Management Automation," 12 pages, http://citeseer.ist.psu.edu/cache/papers/cs/2810/ftp:zSzzSzftp.sce.carleton.cazSzpubzSznetmanagersSzIMA-IM-99.pdf/el-darieby99intelligent.pdf.

(Continued)

*Primary Examiner* — Phuoc Nguyen
(74) *Attorney, Agent, or Firm* — Shook, Hardy & Bacon L.L.P.

(57) ABSTRACT

Computer-readable media, systems, and methods for model-based data center management. In embodiments, a request to perform a management operation on a device in a data center is received and available paths to the device are determined. The paths are determined based on an artifact storing a topology of the data center. Further, a current favored path that is one of the available paths is determined based on a policy and the device is bound for performance of the management operation using the current favored path. In embodiments, the model-based data center management is configured to provide a generic description of the data center architecture and a generic description for one or more devices in the data center. The generic description provides for dynamic runtime data center configuration.

18 Claims, 7 Drawing Sheets

OTHER PUBLICATIONS

Oscar Backstrom and Bjorn Karlsson, "Intelligent Sensor Networks—an Agent-Oriented Approach" Submitted for the Degree of Master of Science in Electrical Engineering in focus of Telecommunication, Department of Technology, University of Kalmar, S-391 81, Kalmar, Sweden, Apr. 2004, 77 pages, http://crl.se/publications/Intelligentsub.--Sensor.sub.--Networks- .pdf.

* cited by examiner

MODEL-BASED DATA CENTER MANAGEMENT

CROSS-REFERENCE TO RELATED APPLICATIONS

This application is a continuation of and claims priority from U.S. application Ser. No. 11/965,915, filed Dec. 28, 2007, entitled "Model-Based Data Center Management," which is assigned or under obligation of assignment to the same entity as this application, the entire contents of the application being herein incorporated by reference.

BACKGROUND

Data centers are facilities for housing computer systems and various components associated with the computer systems. For example, a typical data center may include, in addition to computer systems, backup power supplies, backup data communication connections, environmental controls, and security components. In the exemplary data center, human operators monitor the devices and, where an operation needs to be performed on one of the devices, the human operators communicate directly with the device. In order to perform the direct communication, the human operator must have access to specific communication protocols, and a communication channel (e.g. a physical link), for each device. For instance, for every device in the data center, the human operators need manufacturer and model information to perform operations. Unfortunately, the typical data center organizational scheme is cumbersome because there is no extensible framework for dynamically modifying and updating the data center.

SUMMARY

Embodiments of the present invention relate to computer-readable media, systems, and methods for model-based data center management. In embodiments, a request to perform a management operation on a device in a data center is received. Available paths to the device are determined, each path having one or more hops. A current favored path is determined from the set of available paths. In embodiments, the paths are determined based on an artifact storing a topology of the data center. The model-based data center management is configured to provide a generic description of the data center architecture and a generic description for devices in the data center. The generic description provides dynamic runtime data center configuration including configuration of one or more drivers associated with the one or more devices, configuration of the policy, and addition of one or more additional devices.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention relate to model-based data center management, providing an extensible framework for configuring, replacing, and adding devices during runtime. In various examples, a model may be used that generically describes the data center architecture and the devices in the datacenter. For instance, the model may include a generic description for a number of common data center devices and communication protocols associated with those devices. The model also may include physical channels (links), connections, capacities (e.g. number of slots, ports, network cards, etc.), capabilities (e.g. processor supports virtualization, blade has light emitting diodes (LEDs), etc.), configuration (version, manufacturer, etc.). Thus, the model is a generic description of devices and is not specific to any particular data center. An instance of the model, however, may be used to describe the topology and devices of a particular data center. As used herein, the singular or plural form of the term "device" may be used to indicate any of various devices in a data center including, but not limited to, to computer systems, backup power supplies, backup data communication connections, environmental controls, security components, networking gear (e.g. load balancers, switches, firewalls, routers, etc.), and power distribution devices. As will be discussed in more detail herein, having created an instance of the model for a particular data center, an operation to be performed on a device in the data center may be initiated (either by a human operator or by a computerized data center controller). The operation may be carried out using a policy for device communication without the necessity of specific device information available to the party initiating the communication. The term "management operation," and variations thereof, is used throughout to describe operations that may be performed by the management operations broker. As used herein, "management operation" includes various operations that may be performed in a data center. The term is not limited to any particular operations within a data center. Instead, it is contemplated and within the scope of embodiments of the present invention that management operations broadly describe data center operations that may be performed using model-based data center management.

At various points herein, communications between a model-based data center management system and particular devices are described. It should be noted that, although these communications are described generically, the generic description includes various types of communication. For instance, the communication includes both in-band communication (e.g. through an operating system) and out-of-band communication (e.g. through a specific management interface disjoined from the typical operating system path). It is contemplated by the inventors, and included within the scope of the present invention, that communication includes these and other types of communication in a data center.

Accordingly, in one aspect, the present invention is directed to one or more computer-readable media having computer-executable instructions embodied thereon that, when executed, perform a method for model-based data center management. The method includes receiving a request to perform a management operation on a device in a data center and determining available paths to the device based on an artifact storing a topology of the data center. As used herein, the term "path" contemplates a route from a management operations broker to an end point device (typically, but not always, the end point device is the device on which the operation is being performed). Stated differently, a path is a number of connections through devices in a data center to a device from an operations broker. In embodiments, the path may be direct (in which case the device is directly accessible to the management operations broker) or indirect (in which case there are a number of intermediate devices between the management operations broker and the device). Thus, various paths may include one or more hops. A hop is an intermediate device between the management operations broker and the end point device. Thus, where there are a number of intermediate devices, the path is considered to have a number of hops. As used herein, the term "hop device" is used to connote devices along a path that are not the end point device (the device on which the operation is to be performed). The method further includes determining a current favored path that is one of the available paths based on a policy and binding the device for performance of the management operation using the current favored path. Further, the model-based data center management is configured to provide a generic description of the data center architecture and a generic description for the devices in the data center. Still further the model-based data center management enables dynamic runtime data center configuration including configuration of drivers associated with the devices, configuration of the policy, and addition of one or more additional devices.

In another aspect, the present invention is directed to one or more computer-readable media having computer-executable instructions embodied thereon that, when executed, perform a method for model-based data center management. The method includes communicating a request, to a management operations broker, to perform a management operation on a device in a data center and receiving an indication, from the management operations broker, indicating whether the management operation was successful or unsuccessful. In this aspect, the management operations broker determines available paths to the device based on an artifact storing a topology of the data center. Each of the available paths may include a hop device at each hop along the path. Of course some paths may have a zero length where there is a directly accessible communication between the management operations broker and the end point device. The management operations broker determines a current favored path that is one of the available pats and binds the device for performance of the management operation using the current favored path. Further, the model-based data center management is configured to provide a generic description of the data center architecture and a generic description for the devices in the data center. Still further the model-based data center management enables dynamic runtime data center configuration including configuration of drivers associated with the devices, configuration of the policy, addition of one or more additional devices, and iterating the device drivers themselves.

In yet another aspect, the present invention is directed to a computerized system for model-based data center management. The system includes a management operations broker configured to receive a request to perform a management operation on a device in a data center, coordinate communication with the device, and perform the management operation on the device. The system further includes a physical model component configured to determine one or more available paths to the device based on an artifact that stores a topology of the data center and a policy component configured to determine a current favored path that is one of the one or more available paths based on a policy, each of the one or more available paths including one or more hop devices. Further, the system includes a device manager component configured to build a set of instructions for communicating between the management operations broker and the device, the set of instructions including a device driver stack and an indication of whether the device has delegated management of the device to another device, the device driver stack including a set of communications protocols for communicating with one of the one or more hop devices in the current favored path. Still further, a database is included in the system that is configured to store information associated with the model-based data center management, the model-based data center management is configured to provide a generic description of the data center architecture and a generic description for the devices in the data center. And the model-based data center management enables dynamic runtime data center configuration including configuration of drivers associated with the devices, configuration of the policy, and addition of one or more additional devices.

Having briefly described an overview of embodiments of the present invention, an exemplary operating environment is described below.

Figure 1:
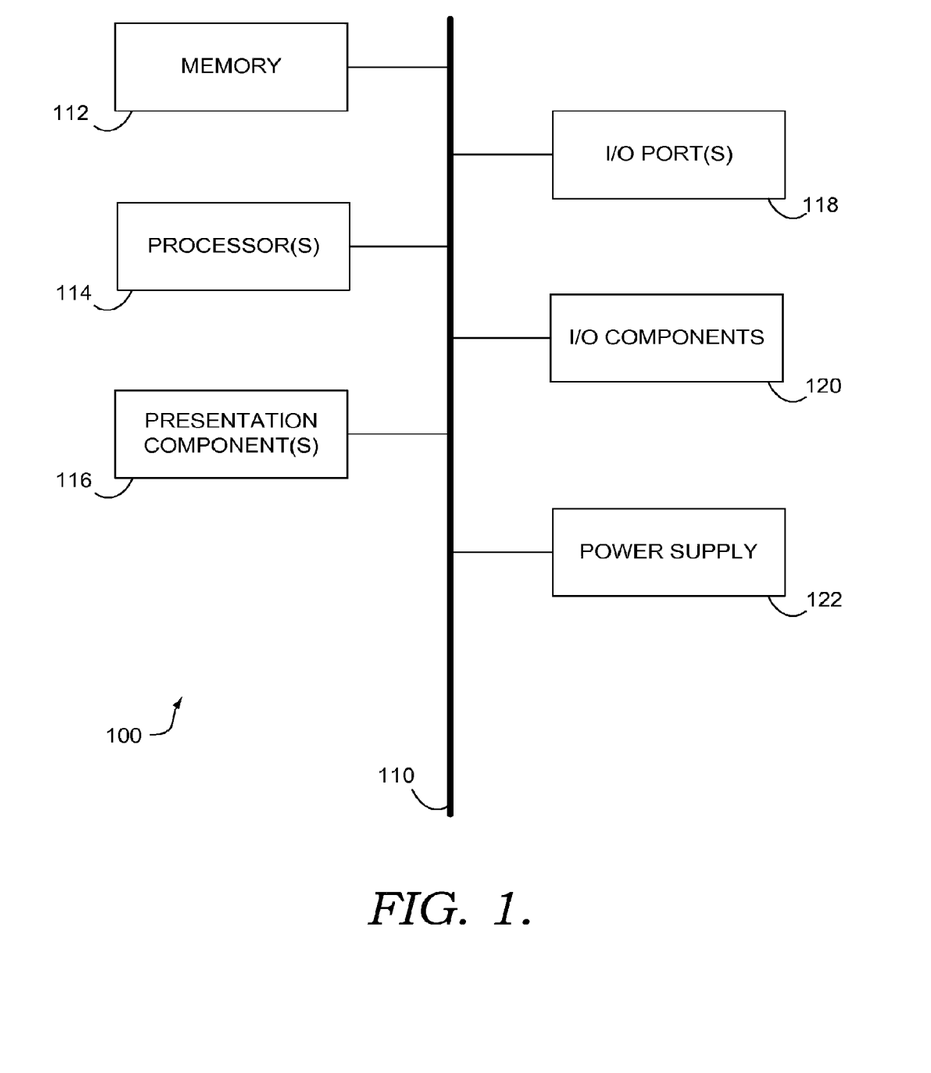
FIG. 1 is a block diagram of an exemplary computing system environment suitable for use in implementing the present invention.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. The phrase "computer-usable instructions" may be used herein to include the computer code and machine-usable instructions. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc. Although not shown, computing device 100 may, in embodiments, a network interface (e.g. an Ethernet port) and a management interface (e.g. an RS-232 port).

Figure 2:
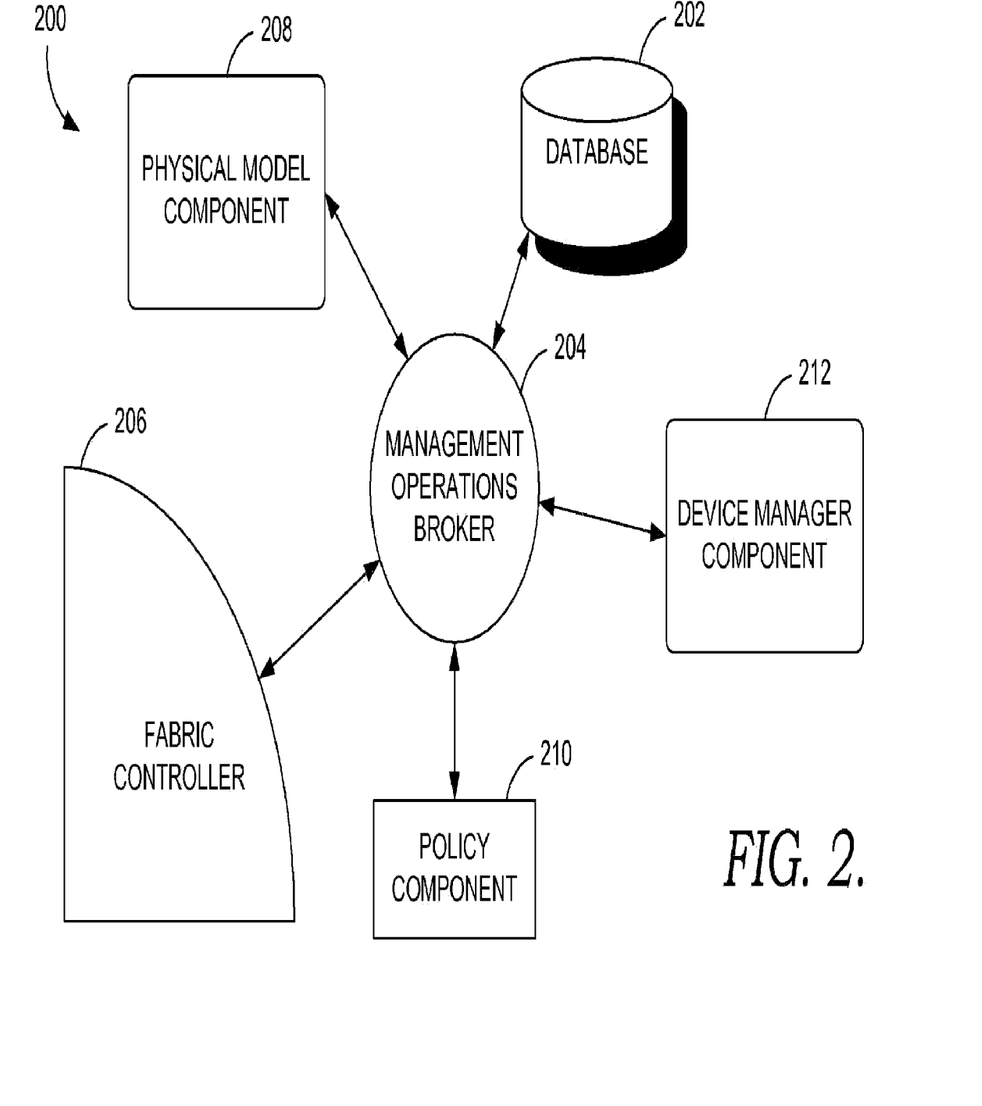
FIG. 2 is a block diagram illustrating an exemplary system for model-based data center management, in accordance with an embodiment of the present invention.

Turning now to FIG. 2, a block diagram is provided illustrating an exemplary system 200 for model-based data center management, in accordance with an embodiment of the present invention. The system 200 includes a database 202, a management operations broker 204, a fabric controller 206, a physical model component 208, a policy component 210, and a device manager component 212. The various components in system 200 may be in communication with one another via a network. Networking environments are commonplace in data centers and, accordingly, the specific communications between the components illustrated will not be further described herein.

Database 202 is configured to store information associated with a model-based data center management. In various embodiments, without limitation, such information may include an instance of a data center model, represented by an artifact. In an embodiment, the artifact includes information regarding the topology of a particular database. Such artifacts, however, can be stored in formats other than on a database. For instance, it is contemplated and within the scope of the present invention that artifacts may be stored as an XML document. For illustrative purposes, database 202 is shown representing one or more embodiments of the present invention. In various embodiments, database 202 is configured to be searchable so that management operations broker 204, or other components of system 200, may retrieve information associated with model-based data center management. Database 202 may be configurable and may include various information relevant to model-based data center management. The content and/or volume of such information are not intended to limit the scope of embodiments of the present invention in any way. Further, although illustrated as a single, independent component, database 202 may, in fact, be a plurality of databases, for instance, a database cluster, portions of which may reside on a computing device associated with management operations broker 204, fabric controller 206, physical model component 208, policy component 210, device manager component 212, on another external computing device, or any combination thereof.

Management operations broker 204 may be a type of computing device, such as computing device 100 described with reference to FIG. 1, for example. Or, management operations broker may reside on a type of computing device, such as computing device 100 described with reference to FIG. 1. In embodiments, management operations broker 204 may be configured to receive a request to perform a management operation on a device in a data center, coordinate communication with the device, and perform the management operation on the device. As illustrated in FIG. 2, management operations broker 204 is illustrated as separate from physical model component 208, policy component 210, and device manager component 212. This is intended for illustrative purposes and is not meant to limit the system of the present invention to any particular compartmentalized configuration. For example, in various embodiments, parts or all of management operations broker 204, physical model component 208, policy component 210, and device manager component 212 may reside on or comprise a single computing device. Each of these configurations, and others, are included and within the scope of the present invention.

As previously stated, management operations broker 204 may be configured to receive a request to perform a management operation on a device in a data center. For instance, the request may come from fabric controller 206 and may include one or more various types of management operations used in a data center. By way of example, fabric controller 206 may request that a particular blade in the data center be powered off. Or, fabric controller 206 may request that management operations broker 204 configure a device. Still further, it may be requested that a device add users or change passwords. These examples are intended for illustrative purposes only and are in no way meant to limit the scope of the present invention to particular management operations. Instead, it is contemplated and within the scope of the present invention that various data center operations may be requested of management operations broker 204. In embodiments, fabric controller 206 may be sending an instruction received directly from a human data center manager. And, in other embodiments, fabric controller 206 may be sending an instruction received from a computer program monitoring and managing the data center. The specific details of fabric controller 206 are beyond the scope of the present invention and, thus, are not discussed in detail herein. But it is contemplated that the present invention receives a request to perform a management operation on a device in the data center.

Management operations broker 204 may also be configured to coordinate communication with a device. For instance, management operations broker 204 may communicate with physical model component 208 to determine a topology for the data center. Stated differently, physical model component 208 may, in an embodiment, have access to an artifact that includes information related to specific devices in the data center (e.g. communications protocols and connections), as well as an overall architecture of the entire data center (e.g. layout of devices and how the devices are connected to one another). Depending upon how devices are connected, various paths may be available for communicating with a device. Thus, physical model component 208 may provide management operations broker 204 available paths to the device based on an artifact having the topology of the data center. In an embodiment, the device management operations broker 204 is seeking communication with may have delegated control over it to another device. In that instance, physical model component 208 will recognize that control of the device has been delegated and provide available paths for communicating with the device to which control has been delegated.

Having determined available paths to the device, management operations broker 204 will, in various embodiments, work with policy component 210 to determine which available path is the best path. Depending upon the available paths, policy component 210 will apply a set of policies to determine the current favored path based on factors such as number of hops (other devices existing along the path), types of hops, connections to other devices, etc. In other words, working with policy component 210, management operations broker 204 will determine, at runtime, how to traverse the graph of manageable nodes (or hops) in a datacenter. By way of example, without limitation, assume the management operation is to power down a blade and the power down is going to be performed by turning off a power switch associated with the blade. Policy component 210 might recognize that the power strip is presently powering five other devices and, by shutting down power to the power strip, the other five devices will be unintentionally shut down as well. In that instance, policy component 210 may choose another path (such as turning off the blade directly instead of turning off its power supply using the power switch) as the current favored path. If no viable paths are available, policy component 210 may indicate the status to management operations broker 204.

In order to establish communications with the device (referred to herein as end point device), management operations broker 204 will, in various embodiments, work with device manager component 212 in order to bind the end point device and management operations broker 204. For instance, device manager component 212 may provide management operations broker 204 with a set of instructions for communicating with the device. This set of instructions allows management operations broker 204 to be communications protocol agnostic because management operations broker 204 does not need to know the communications protocol and procedure for contacting each device individually. Instead, management operations broker 204 requests to be bound by device manager component 212. Device manager component 212 will build a device driver stack that includes, at each level in the stack, communications protocols for communicating with each hop in the path. Stated differently, assuming there are two hops (e.g. devices) in the path before the end point device. Device manager component 212 will build a stack of communications protocols, the top of the stack having the communications protocols for the first of the two hops, the middle of the stack having communications protocols for the second hop and the bottom of the stack having communications protocols for the end point device. The device driver stack may be built by first communicating directly with the end point device and then by traversing the current favored path backwards, allowing each device at each hop along the way to wrap the device driver stack with a layer of communications protocols. In embodiments, instructions from device manager component 212 may include information other than merely the device driver stack. For instance, the instruction may include an indication of whether the device had delegated management of the device, which may impact communications with the device. As used herein, delegated management includes instances where a device delegates some or all control to another device. For instance, a device may delegate control of its power to an intelligent power switch. In that case, to turn the device on or off, the management operations broker would need to communicate with the switch because the switch ahs the delegated control. Or a device may delegate all control to another device. By way of example, a blade may delegate control of all operations to a management device that may be in charge of a number of blades.

In embodiments, the model describes a device including actions, capabilities, and device type, which constitutes a set of constraints. Thus, a particular device declares its capabilities (device type, actions, etc.). Embodiments of the present invention also include selecting and instantiating the appropriate device driver given the constraints. For instance, assuming device A is version 2 and there are two device drivers, namely DD1 and DD2. DD1 may, in this example, specify compatibility with versions 1 and 2, while DD2 may be compatible only with version 2. In this case, both drivers (DD1 and DD2) satisfy the requirements to talk to device A because they both satisfy the version (e.g. version 2).

Using the device driver stack (and other instruction) to communicate directly with the end point device without having knowledge of the end point device's specific protocols. In other words, management operations broker 204 can take the device driver stack and, using the top layer, communicate with the next device on the current favored path, including in the communication an instruction for the end point device. The hop device will receive the communication, peel the top layer off of the device driver stack, and expose communications protocols so that it can communicate with the next device in the current favored path. This process will continue until the end point device is reached, at which point the instruction will be communicated from the management operations component 204.

Thus, by using the various components of system 200, management operations broker 204 can communicate with an end point device in an extensible manner, without having specific knowledge as to the model, manufacturer, and communications protocol required by the specific end point device. Moreover, the model can be updated at runtime such that a new device may be added to the data center, updated on the topology, and communicated with by management operations broker 204, because the model includes a generic description of the device and the topology is updated to include it. Also, the model-based data center management will enable runtime configuration of drivers associated with existing devices as well as configuration of the policy (e.g. the data center manager wants to change how the policy chooses particular current favored paths).

Figure 3:
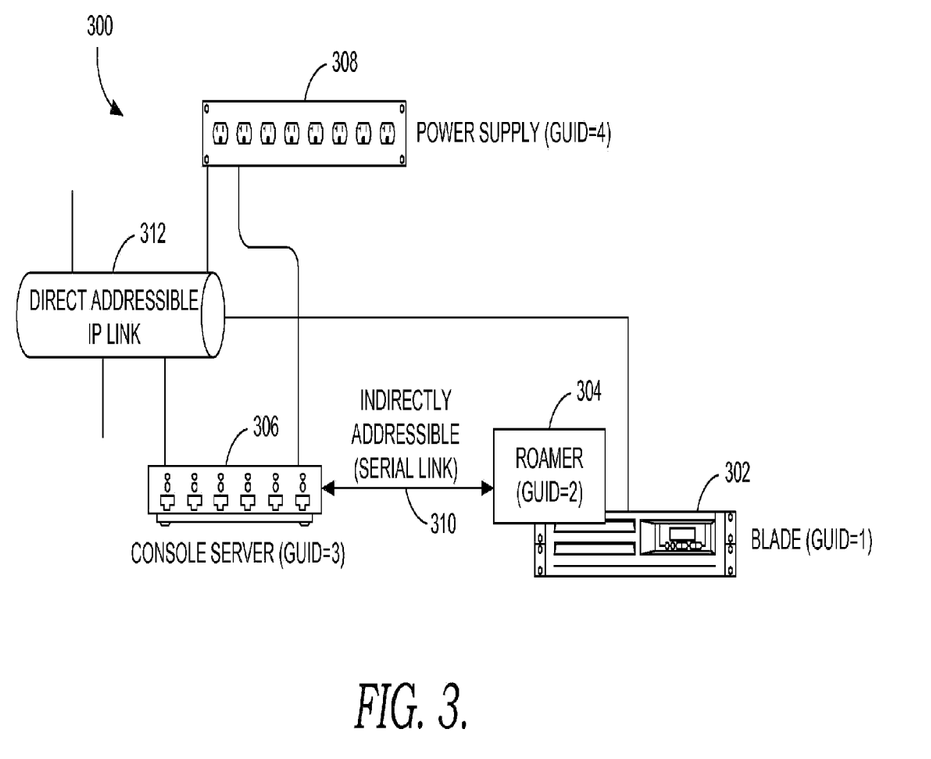
FIG. 3 is a block diagram illustrating an exemplary instance of a model-based data center, including various devices, in accordance with an embodiment of the present invention.

Turning now to FIG. 3, a block diagram illustrating an exemplary instance of a model-based data center, including various devices, is illustrated, in accordance with an embodiment of the present invention and designated generally as reference numeral 300. The exemplary data center instance 300 includes a blade 302 (having GUID=1), a roamer 304 (having GUID=2), a console server 306 (having GUID=3), and a power supply 308 (GUID=4). As illustrated, the blade 302, roamer 304, console server 306, and power supply 308 are connected by indirectly addressable link 310 and directly addressable link 312. In this illustrative example, assume a management operations broker, e.g. management operations broker 204 of FIG. 2, is directly connected to (or can directly address) directly addressable link 312. Also assume that the management operations broker receives a request to do a management operation such as power off blade 302.

As previously discussed, for the management operations broker to communicate with blade 302, the management operations broker must, in this example, first obtain information regarding the topography of the data center from an artifact, e.g., using a physical model component such as physical model component 208 of FIG. 2. In this example, the physical model component will also provide information about the blade itself. For instance, assume here that the blade has delegated management to roamer 304. In embodiments, the delegated management does not have to be explicit. Instead, it is contemplated that, in embodiments, the delegated management may be inferred using the model. Now that the management operations broker has information regarding the topology of the data center and the specific settings of blade 302, the management operations broker will request a set of instructions for communicating with blade 302 from a device manager, e.g. device manager component 212 of FIG. 2. Although here, because blade 302 has delegated management to roamer 304, the management operations broker will seek communication with roamer 304. The device manager will request roamer 304 (the device with GUID=2) and determine that the device is indirectly accessible through console server 306 (the device with GUID=3). Thus, the device manager will then request console server 306 and determine that it is directly addressable. Having determined a path to roamer 304 (the end point device in this example), the device manager will build a device driver stack needed to communicate with roamer 304 and communicate the device driver stack, and possibly other instructions, to the management operations broker.

Supplied with instructions of how to communicate with roamer 304, the management operations broker can now call roamer 304 and attempt to perform the management operation (here powering off blade 302). If the attempt is successful, blade 302 will be powered down and, in embodiments, the management operations broker may report the success, e.g. to a fabric controller such as fabric controller 206 of FIG. 2. If the attempt is unsuccessful, the management operations broker may communicate with the physical model component and the device manager to determine an alternative path, raising the favored alternative path to the level of current favored path. If such an alternative is available, the management operations broker may again request communications instructions from the device manager and may attempt to perform the management operation on the device. In the present example, the alternative path might involve using power supply 308 to reset the power port for blade 302. Or, the alternative path might involve cycling power to the entire power supply 308. The decisions of whether to attempt the management operation using the paths will be based on the current state of the data center and the policy supporting the data center. For instance, where a number of other blades (not shown) are connected to power supply 308, the policy may determine that it is not viable to cycle power on the entire power supply 308 because that would power down other blades that are not involved in the management operation. Thus, the model-based data center management provides for not only extensible communication with the devices, but also a policy-driven approach that considers the entire data center configuration in determining whether and how to perform particular management operations.

Throughout the discussion, basic examples have been provided to illustrate context and assist in understanding various embodiments of model-based data center management. Embodiments of the present invention, however, contemplate more complex scenarios than those explicitly discussed herein. For instance, a management operation may require multiple device communications with preserved locking and transactions. One example is creating a virtual LAN (VLAN). The request may be "create VLAN for blade X." Assume blade X resides in a rack connected to switch A. Switch A is redundantly connected to switches B and C. And switches B and C are redundantly connected to routers D and E. To create the VLAN for blade X, a different operation is sent to switch A, switches B and C, and routers D and E. Therefore, five different device driver stacks are, in this example, created and used. Each sub-operation is governed by the policy and when all of the sub-operations have completed successfully, the overall operation is complete. Thus, embodiments of the present invention, in addition to the basic examples discussed, contemplate and include more complex scenarios, such as the exemplary multiple device communication.

Figure 4:
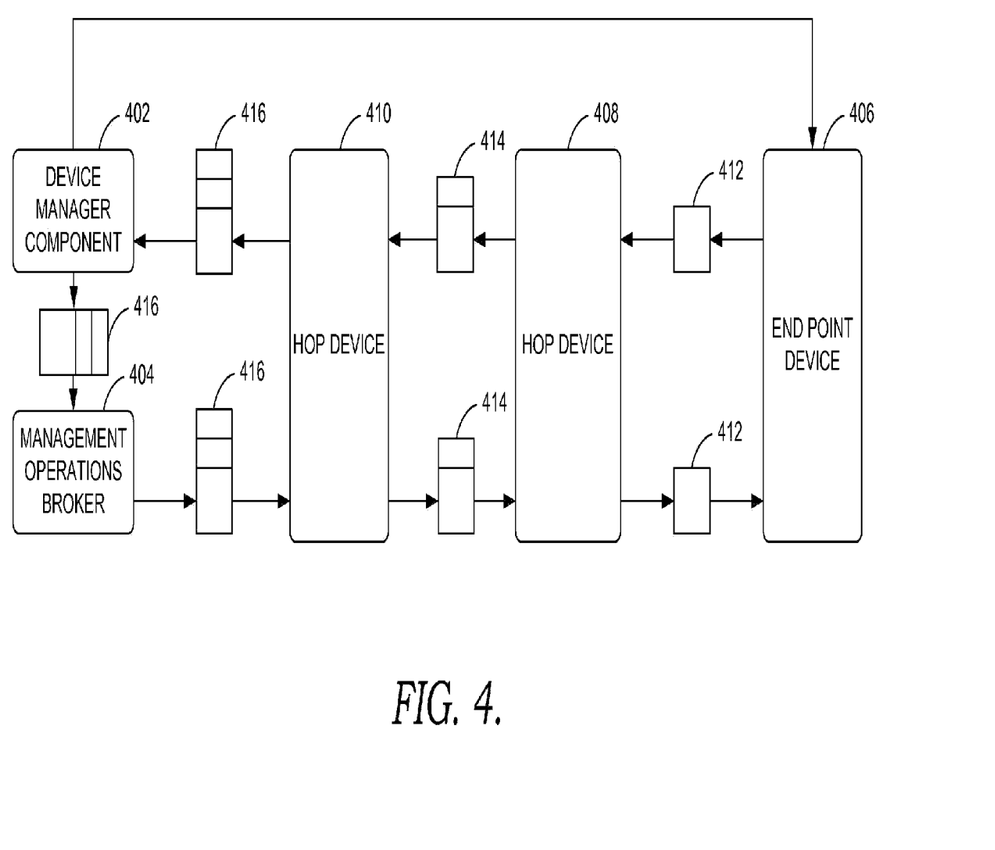
FIG. 4 is a block diagram illustrating a device manager component building a device driver stack and communicating the device driver stack to a management operations broker for extensible communication with the device through various hop devices along a current favored path, in accordance with an embodiment of the present invention.

Turning now to FIG. 4, a block diagram of a device manager component building a device driver stack and communicating the device driver stack to a management operations broker for extensible communication with the device through various hop devices along a current favored path, in accordance with an embodiment of the present invention, is illustrated and designated generally as reference numeral 400. As illustrated, the exemplary data center 400 includes a device manager component 402, a management operations broker 404, an end point device 406, a hop device 408 and a hop device 410. In this illustration, assuming device manager component 402 has been requested to bind management operations broker 404 with end point device 406, device manager component will contact end point device 406. For instance, as illustrated here, device manager component 402 will index, classify, and load device drivers for the one or more hop devices into the device driver stack. End point device 406 will initialize a device driver stack, wrapping the stack with a set of communication protocols and other information necessary to communicate with end point device 406. The configuration illustrated here assumes that the devices shown are the current best path for communication between management operations broker 404 and end point device 406.

Hop device 408 will receive the device driver stack 412 from end point device 406. As illustrated, the device driver stack is indicated with the numerals 412, 414, and 416 to indicate various layers of communications protocols in the device driver stack. But the device driver stack can be considered, at least conceivably, as the same stack throughout FIG. 4, just having more or less information as the stack progresses from one device to another. Hop device 408 will wrap the stack with another set of communication protocols and information necessary to communicate with hop device 408 and will then send the stack up the path to hop device 410, as illustrated at 414. Similarly, hop device 410 will receive device driver stack 414, add another layer of communication protocols and send the stack up the path to device manager component 402, as illustrated at 416. In this illustration, hop device 410 is directly accessible, similar to the direct accessible link discussed with reference to FIG. 3.

Having built a device driver stack, device manager component 402 will communicate the device driver stack, and other necessary information, to management operations broker 404, allowing management operations broker 404 to be bound to end point device 406. Thus, management operations broker 404 will send a management operation using the device driver stack. In communication, the device driver stack will control the protocols with the next device on the path. In other words, the top layer of the device driver stack will control how management operations broker 404 talks to hop device 410. Hop device 410 will peel the top layer off the stack (because it is specific to hop device 410) and the next layer in the stack will control how hop device 410 talks to hop device 408, as illustrated at 414. Again, hop device 408 will peel the top layer off the device driver stack and, as illustrated at 412, use the device driver stack to communicate with end point device 406. Thus, management operations broker 404 and end point device 406 are bound. Management operations broker 404 can communicate in an extensible manner with end point device 406 because management operations broker 404 does not need to know the specific communication protocols necessary for communicating with end point device 406 or hop devices 408 and 410. Instead, management operations broker 404 can act as if it were communications protocol agnostic and use the device driver stack 416 to perform the communications with end point device 406.

In embodiments, while management operations broker 404 is bound to end point device 406, end point device 406 will be locked. For instance, if management operations broker 404 is locked to end point device 406, other management operations cannot be performed on end point device 406 until the communication between it and management operations broker 404 has been completed. Those having ordinary skill in the art will understand and appreciate available queuing techniques for management operations that occur while end point device 406 is locked.

Figure 5A:
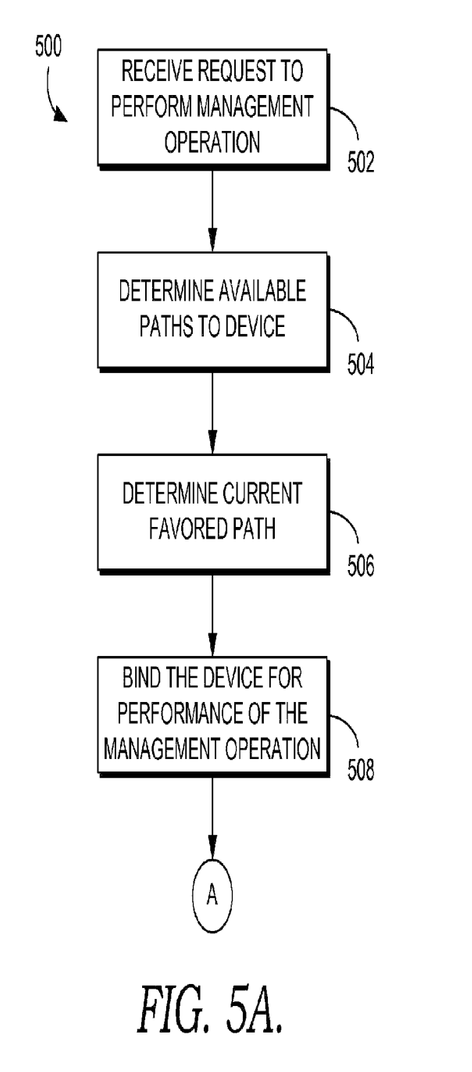
FIG. 5A is a flow diagram illustrating an exemplary method for model-based data center management, in accordance with an embodiment of the present invention.

Turning now to FIG. 5A, a flow diagram of an exemplary method for model-based data center management, in accordance with an embodiment of the present invention, is illustrated and designated generally as reference numeral 500. Initially, as indicated at step 502, a request to perform a management operation on a device in a data center is received, e.g. by management operations broker 204 of FIG. 2 from e.g., a fabric controller such as fabric controller 206 of FIG. 2. At step 504, one or more available paths to the device are determined based on an artifact storing a topology of the data center, e.g. by physical model component 208 of FIG. 2. As previously discussed, on a high level, a model includes generic descriptions for a data center and generic descriptions for devices in a data center. A particular instance of the model represents a topology for a particular data center and that particular instance may, in embodiments, be stored in an artifact. The artifact may be a portion of a database, such as database 202 of FIG. 2, or the artifact may be stored in another manner, such as in an XML file.

At step 506, a current favored path is determined from the available paths, e.g., by policy component 210 of FIG. 2. As previously discussed, the determination of the current favored path may be based on a number of factors involved in data center management, such as the particular devices along hops of the available paths, the management operation to be performed, other devices associated with an end point device and devices along hops of the available paths, etc. This list of considerations is not intended to limit the scope of embodiments of the present invention to any examples discussed herein. Instead, these and other considerations may be included in a policy. Indeed, part of the model-based data center management is a runtime configurable policy, allowing a data center manager to configure the policy based on various considerations that are important to the data center manager. Throughout the discussion, the term "policy" has been used to describe a set of rules to be applied to the model-based data center management. It should be noted, however, that embodiments of the present invention contemplate various implementations of the policy. For instance, the policy may be hard-coded (e.g. RETE rules, etc.). Or, the policy can be added and/or modified dynamically, for instance during runtime. Thus, the term policy is intended to be understood broadly as describing a set of governing rules that may be applied using model-based data center management.

The device is bound at step 508, allowing performance of the management operation using the current favored path. For instance, the device may be bound by device manager component 212 of FIG. 2. As previously discussed, in embodiments, binding the device allows for communication of the management operation, e.g. by management operations broker 204 of FIG. 2 in an extensible manner. Also, as previously discussed, while the device is bound in communication, in various embodiments, the device may be locked, preventing access for other management operations until the ongoing management operation has been completed.

Figure 5B:
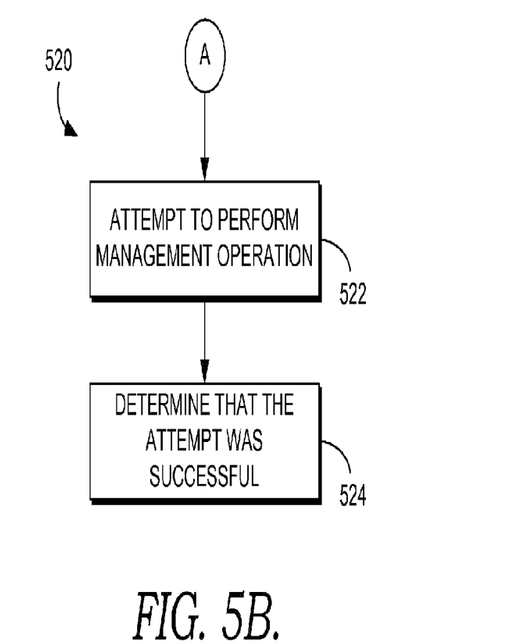
FIG. 5B is a flow diagram illustrating an exemplary method for model-based data center management, in accordance with an embodiment of the present invention, the method extending from the method of FIG. 5A and successfully performing a management operation.

Turning now to FIG. 5B, a flow diagram of an exemplary method for model-based data center management, in accordance with an embodiment of the present invention, the method extending from the method of FIG. 5A and successfully performing a management operation, is illustrated and designated generally as reference numeral 520. Initially as indicated at step 522, performance of a management operation is attempted, e.g. by management operations broker 204 of FIG. 2. At step 524 it is determined that the attempt was successful. It should be noted that the determination of success or failure does not have to come directly from the operations. For instance, in embodiments, success or failure may be inferred (e.g.

recognizing that the operation did not occur). Or, success or failure may be driven via the policy.

Figure 5C:
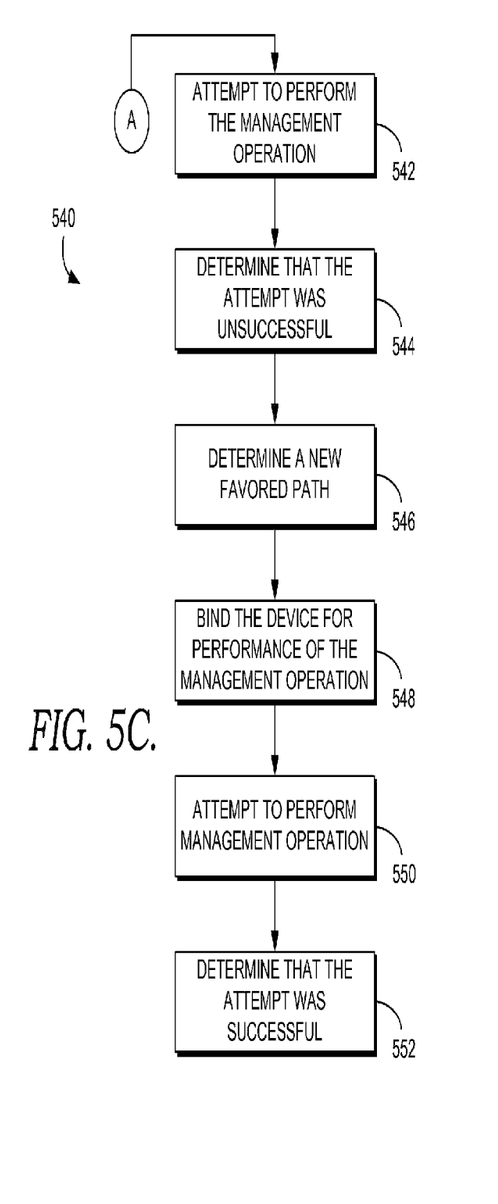
FIG. 5C is a flow diagram illustrating an exemplary method for model-based data center management, in accordance with an embodiment of the present invention, the method extending from the method of FIG. 5A and determining a new successful path for performing a management operation.

Turning now to FIG. 5C, a flow diagram of an exemplary method for model-based data center management, in accordance with an embodiment of the present invention, the method extending from the method of FIG. 5A and determining a new successful path for performing a management operation, is illustrated and designated generally as reference numeral 540. Initially at step 542, performance of a management operation is attempted, e.g. by management operations broker 204 of FIG. 2. At step 544 it is determined that the attempt was unsuccessful and at step 546 a new favored path is determined. For instance, the new favored path may be determined by employing physical model component 208 of FIG. 2 along with policy component 210 of FIG. 2. In embodiments, the new path will be treated as the current favored path and, at step 548, the device will be bound using the new path. At step 550, performance of a management operation is again attempted, e.g. by management operations broker 204 of FIG. 2. And at step 552 it is determined that the attempt was successful.

Figure 5D:
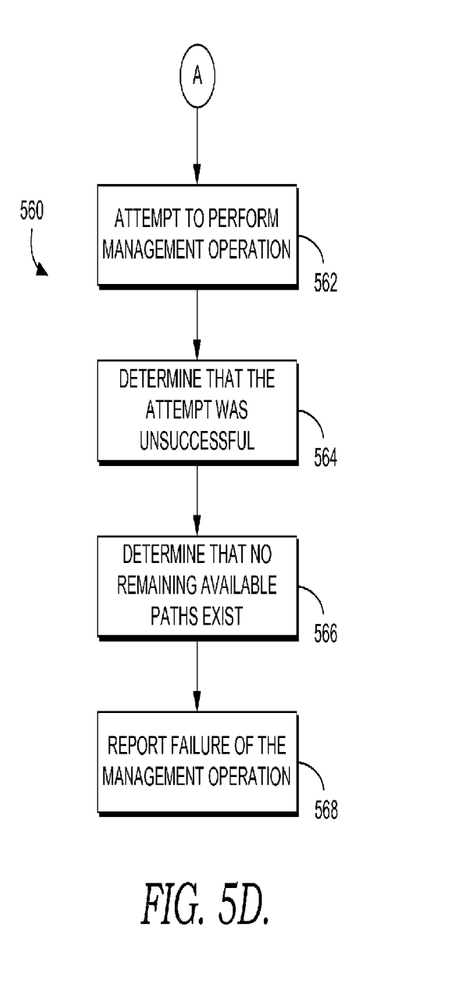
FIG. 5D is a flow diagram illustrating an exemplary method for model-based data center management, in accordance with an embodiment of the present invention, the method extending from the method of FIG. 5A and unsuccessfully performing a management operation.

Turning now to FIG. 5D, a flow diagram of an exemplary method for model-based data center management, in accordance with an embodiment of the present invention, the method extending from the method of FIG. 5A and unsuccessfully performing a management operation, is illustrated and designated generally as reference numeral 560. Initially, at step 562, performance of a management operation is attempted, e.g. by management operations broker 204 of FIG. 2. At step 564 it is determined that the attempt was unsuccessful and at step 566 it is determined that there are no remaining available paths. In embodiments, the lack of remaining available paths may be due to various policy considerations. For instance, there may have been only one available path for communicating with the device and, where that path does not work, there is no alternative. Also, there may be a number of paths to the device, but for policy reasons none of the other paths are viable. For instance, using the example of FIG. 3 where the management operation was to power off blade 302, if the only remaining alternative is to power off the entire power supply 308, the policy may be to fail the management operation. Having failed to perform the management operation, the failure will be reported, e.g., to a fabric controller such as fabric controller 206 of FIG. 2, as illustrated at step 568.

Figure 6:
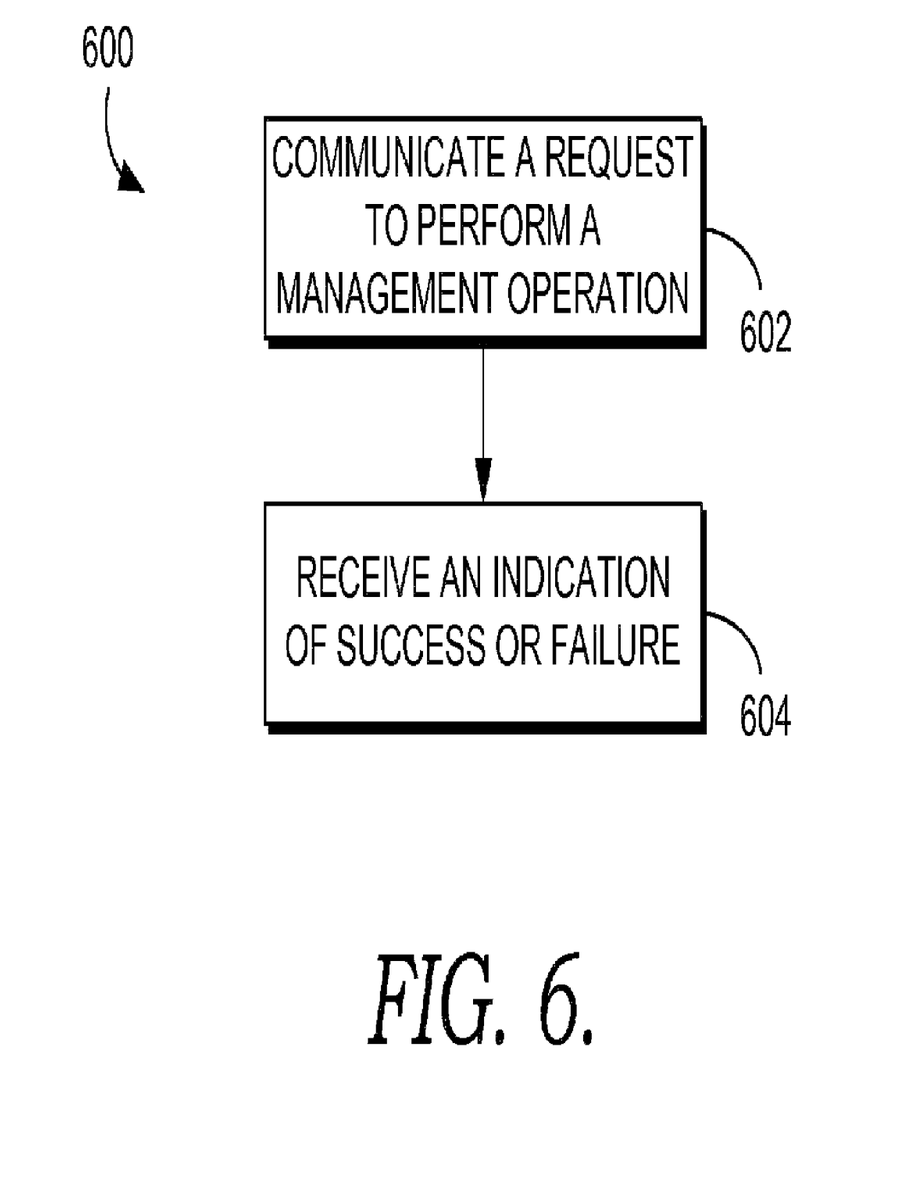
FIG. 6 is a flow diagram illustrating an exemplary method for model-based data center management, in accordance with an embodiment of the present invention, the exemplary method having a different point of view than the method of FIG. 5A.

Turning now to FIG. 6, a flow diagram of an exemplary method for model-based data center management, in accordance with an embodiment of the present invention, the exemplary method having a different point of view than the method of FIG. 5A, is illustrated and designated generally as reference numeral 600. Initially, as indicated at step 602, a request to perform a management operation on a device in a data center is communicated, e.g. by a fabric controller such as fabric controller 206 of FIG. 2. Next, at step 604, an indication is received from a management operations broker, e.g. management operations broker 204 of FIG. 2, indicating whether the management operation was successful or unsuccessful.

In the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more computer storage media having computer-executable instructions embodied thereon that, when executed, perform a method for model-based data center management, the method comprising:
    receiving a request to perform a management operation on a device in a data center;
    determining one or more available paths to the device based on an artifact storing a topology of the data center;
    determining a current favored path that is one of the one or more available paths based on a policy; and
    binding the device for performance of the management operation using the current favored path by building a device driver stack including at least one communications protocol for communicating with the device, wherein the device driver stack is built by indexing, classifying, and loading device drivers for one or more hop devices into the device driver stack.

2. The computer storage media of claim 1, further comprising:
    executing an attempt to perform the management operation on the device; and
    determining that the attempt to perform the management operation on the device was successful.

3. The computer storage media of claim 1, further comprising:
    executing an attempt to perform the management operation on the device;
    determining that the attempt to perform the management operation on the device was unsuccessful;
    determining a new favored path that is different from the current favored path and that is one of the one or more available paths;
    binding the device for performance of the management operation using the new favored path;
    attempting to perform the management operation on the device; and
    determining that the attempt to perform the management operation on the device was successful.

4. The computer storage media of claim 1, further comprising:
 executing an attempt to perform the management operation on the device;
 determining that the attempt to perform the management operation on the device was unsuccessful;
 determining that, of the one or more available paths, no path exists that has not been attempted unsuccessfully; and
 reporting failure of the management operation.

5. The computer storage media of claim 1, wherein the device has delegated management of the device to a management device, and wherein binding the device for performance of the management operation using the current favored path includes binding the management device.

6. The computer storage media of claim 1, wherein the management operation includes at least one of an instruction to add users to the device and an instruction to change a password for acquiring access to the device.

7. The computer-readable media of claim 1, wherein binding the device for performance of the management operation comprises:
 requesting a device manager to bind the device; and
 receiving from the device manager a set of instructions for communicating with the device.

8. The computer-readable media of claim 7, wherein the device manager builds a device driver stack and wherein each instance in the device driver stack includes a set of communications protocols for communicating with one or more hop devices in the current favored path.

9. The computer storage media of claim 1, wherein the set of instructions for communicating with the device includes the device driver stack and an indication of whether the device has delegated management of the device to another device.

10. The computer storage media of claim 9, wherein the device manager locks the device during an attempt to perform management operation on the device.

11. One or more computer storage media having computer-executable instructions embodied thereon that, when executed, perform a method for model-based data center management, the method comprising:
 communicating a request, to a management operations broker, to perform a management operation on a device in a data center; and
 receiving an indication, from the management operations broker, indicating whether the management operation was successful or unsuccessful,
 wherein the management operations broker determines one or more available paths to the device based on an artifact storing a topology of the data center,
 wherein the management operations broker determines a current favored path that is one of the one or more available paths based on a policy, and
 wherein the management operations broker binds the device for performance of the management operation using the current favored path by building a device driver stack for one or more hop devices of the one or more available paths by indexing, classifying, and loading device drivers for the one or more hop devices into the device driver stack.

12. The computer storage media of claim 11,
 wherein the management operations broker attempts to perform the management operation on the device,
 wherein the management operations broker determines that the attempt to perform the management operation on the device was successful, and
 wherein the indication indicates that the management operation was successful.

13. The computer storage media of claim 11,
 wherein the management operations broker attempts to perform the management operation on the device,
 wherein the management operations broker determines that the attempt to perform the management operation on the device was unsuccessful, and
 wherein the management operations broker determines that, of the one or more available paths, no path exists that has not been attempted unsuccessfully, and
 wherein the indication indicates that the management operation was unsuccessful.

14. The computer storage media of claim 11, wherein the management operation includes at least one of an instruction to add users to the device and an instruction to change a password for acquiring access to the device.

15. The computer-readable media of claim 11, wherein the management operations broker binds the device for performance of the management operation using the current favored path by requesting a device manager to bind the device and receiving, from the device manager, a set of instructions for communicating with the device.

16. The computer-readable media of claim 15, wherein the device manager builds a device driver stack and wherein each instance in the device driver stack includes a set of communications protocols for communicating with one or more hop devices in the current favored path.

17. The computer-readable media of claim 16, wherein the set of instructions for communicating with the device includes the device driver stack and an indication of whether the device has delegated management of the device to another device.

18. The computer storage media of claim 17, wherein the device manager locks the device during an attempt to perform the management operation on the device.

* * * * *